United States Patent
Comer

(10) Patent No.: US 6,233,392 B1
(45) Date of Patent: May 15, 2001

(54) CONSTRAINED ENCODED MOTION VECTORS

(75) Inventor: Mary Lafuze Comer, Fairmount, IN (US)

(73) Assignee: Thomson Consumer Electronics, Indianapolis, IN (US)

( * ) Notice: Subject to any disclaimer, the term of this patent is extended or adjusted under 35 U.S.C. 154(b) by 0 days.

(21) Appl. No.: 09/023,272

(22) Filed: Feb. 13, 1998

(30) Foreign Application Priority Data

Feb. 19, 1997 (DE) .................................................... 9703470

(51) Int. Cl.[7] ....................................................... H04N 5/91
(52) U.S. Cl. ................................ 386/68; 386/82; 386/111
(58) Field of Search ................................ 386/6–8, 33, 68, 386/81–82, 98, 111–112, 124; 375/240.12, 240.16; 382/232, 236, 238

(56) References Cited

U.S. PATENT DOCUMENTS

| | | |
|---|---|---|
| 5,146,325 | 9/1992 | Ng . |
| 5,497,237 | 3/1996 | Hosokawa et al. . |
| 5,550,643 * | 8/1996 | Azadegan ............................. 386/124 |
| 5,623,344 | 4/1997 | Lane et al. . |
| 5,701,164 | 12/1997 | Kato . |
| 5,715,008 | 2/1998 | Sekiguchi et al. . |
| 5,737,022 | 4/1998 | Yamaguchi et al. . |
| 5,828,808 | 10/1998 | Kang . |
| 5,926,604 * | 7/1999 | Yanagihara et al. .................... 386/68 |
| 5,999,696 * | 12/1999 | Tsuga et al. ............................ 386/98 |
| 6,009,229 * | 12/1999 | Kawamura ............................. 386/68 |

FOREIGN PATENT DOCUMENTS

0700221A2   3/1996   (EP) .
0727912A2   8/1996   (EP) .

* cited by examiner

*Primary Examiner*—Thai Tran
*Assistant Examiner*—Christopher Onuaku
(74) *Attorney, Agent, or Firm*—Joseph S. Tripoli; Harvey D. Fried; Francis A. Davenport

(57) ABSTRACT

A storage medium has recorded thereon a packetized digitally encoded image representative signal for forward and reverse direction reproduction. The digitally encoded signal comprises a plurality of groups of pictures, a group of the plurality of groups including at least an intra coded picture and a predicted picture. The intra coded picture type and the predicted picture type each comprise top and bottom fields. The predicted picture type has a first motion vector for decoding in the forward direction, and has a second motion vector for decoding in the reverse direction. In a further inventive arrangement a storage medium has recorded thereon a packetized digitally encoded image representative signal for forward and reverse direction reproduction. The digitally encoded signal comprises a plurality of groups of pictures, a group of said plurality of groups including at least an intra coded picture and a predicted picture. The intra coded picture and the predicted picture comprise a top field and a bottom field. The digitally encoded signal comprises. A motion vector for constructing the predicted picture from a predetermined only one of the top and bottom fields.

10 Claims, 7 Drawing Sheets

MPEG FRAME SEQUENCE

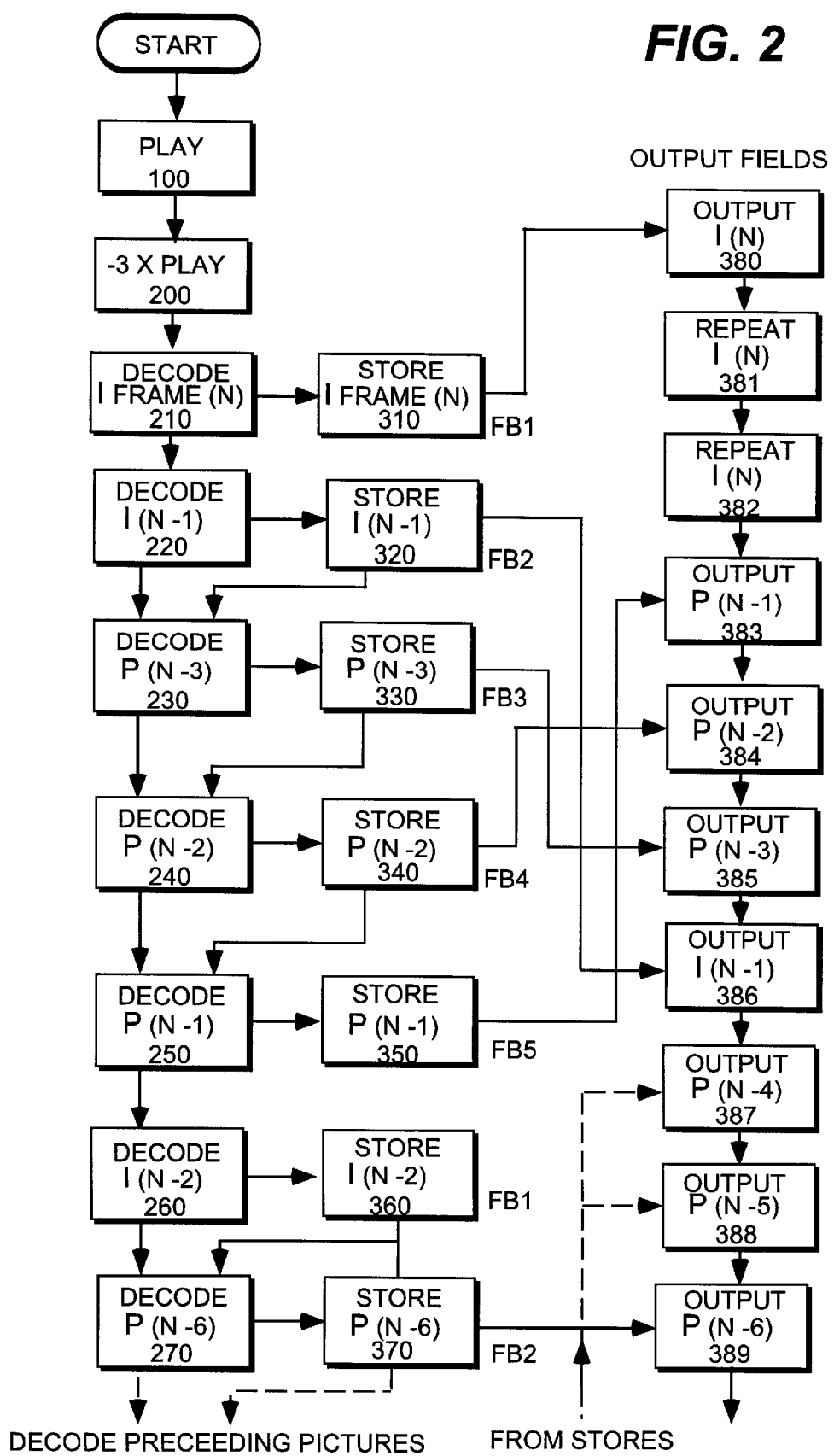

FIG. 7

| GOP A | | | | GOP B | | | | GOP C | P.B. PIC. |
|---|---|---|---|---|---|---|---|---|---|
| I(1) | P(4) | P(7) | P(10) | I(13) | P(16) | P(19) | P(22) | I(25) | O/P FIELD # |
|  |  |  |  |  |  |  |  |  | 24 |
| d1 |  |  |  |  |  |  |  |  | 23 |
| d1 |  |  |  |  |  |  |  |  | 22 |
| d1 |  |  |  |  |  |  |  |  | 21 |
|  | d4 |  |  |  |  |  |  |  | 20 |
|  | d4 |  |  |  |  |  |  |  | 19 |
|  |  | d2 |  |  |  |  |  |  | 18 |
|  |  | d2 |  |  |  |  |  |  | 17 |
|  |  | d2 |  |  |  |  |  |  | 16 |
|  |  |  | D:P2;d |  |  |  |  |  | 15 |
|  |  |  | D:P2;d |  |  |  |  |  | 14 |
|  |  | D>2;P4 |  | d3 |  |  |  |  | 13 |
|  |  |  |  | d3 |  |  |  |  | 12 |
|  |  |  |  | d3 |  |  |  |  | 11 |
|  |  |  |  |  | d2 |  |  |  | 10 |
|  |  |  |  |  | d2 |  |  |  | 9 |
|  | D>4;P1,2 |  |  |  |  | d4 |  |  | 8 |
|  |  |  |  |  |  | d4 |  |  | 7 |
|  |  |  |  |  |  | D>4;P2 |  |  | 6 |
|  |  |  |  |  |  |  | D:P4;d | d1 | 5 |
|  |  |  |  |  |  |  | D:P4;d | d1 | 4 |
|  |  |  |  |  | D>2;P3,4 |  |  | d2 | 3 |
|  |  |  |  | D>3,4 |  |  |  |  | 2 |
| D>1,2 |  |  |  |  |  |  |  | D>1,2;d1 | 1 |

| | GOP A | | | | GOP B | | | GOP C | |
|---|---|---|---|---|---|---|---|---|---|
| I (1) | P(4) | P(7) | P(10) | I (13) | P(16) | P(19) | P(22) | I (25) | PB PIC. |
| | | | | | | | | | O/P FIELD # |
| | | | | | | | | | 12 |
| d1 | | | | | | | | | 11 |
| d1 | | | | | | | | | 10 |
| | d4 | | | | | | | | 9 |
| | | d2 | | | | | | | 8 |
| | | | D,d,P2 | | | | | | 7 |
| | | D>2;P4 | | d4 | | | | | 6 |
| | D>4;P1,2 | | | d3 | | | | | 5 |
| D >1,2 | | | | | d2 | | | | 4 |
| | | | | | | D,d;P2 | | | 3 |
| | | | | | D>2;P3,4 | | | d1 | 2 |
| | | | | | D>3;4 | | | d2 | 1 |
| | | | | | | | | D>1,2;d1 | |

CONSTRAINED ENCODED MOTION VECTORS

This invention relates to MPEG encoded signal decoding, and in particular to the reproduction and decoding of such signals from a medium in a reverse direction.

BACKGROUND OF THE INVENTION

The introduction of disks recorded with digitally compressed audio and video signals, for example, utilizing MPEG compression protocols, offers the consumer sound and picture quality virtually indistinguishable from the original material. However, consumer users will expect such digital video disks or DVDs to offer features similar to those of their analog video cassette recorder or VCR. For example, a VCR may reproduce in either forward or reverse directions at speeds other than the recorded speed. Such non-standard speed playback features are also known as trick play modes. The provision of trick play features are less easily provided with MPEG encoded video signals due to the hierarchical nature of the compression which forms pictures into groups having varying degrees of compression. These groups are termed groups of pictures or GOPs, and require decoding in sequence. A detailed description of the MPEG 2 standard is published as ISO/IEC Standard 13818-2. However, in simple terms, an MPEG 2 signal stream may comprise three types of pictures having varying degrees of content compression. An intra-coded frame or I frame has the least compression of the three types and may be decoded without reference to any other frame. A predicted frame or P frame is compressed with reference to a preceding I or P frame and achieves greater degree of compression than an intra-coded frame. The third type of MPEG frame, termed a bi-directionally coded or B frame, may be compressed based on predictions from either preceding or succeeding frames. Bi-directionally coded frames have the greatest degree of compression. The three types of MPEG frames are arranged in groups of pictures or GOPs. Since only intra-coded frames are decodable without reference to any other frame, each GOP may only be decoded following the decoding of the I frame. The first predicted frame or P frame, may be decoded and stored based on modification of the stored, preceding I frame. Subsequent P frames may be predicted from the stored preceding P frame. Finally, bi-directionally coded or B frames may be decoded by means of predictions from preceding and or succeeding frames, for example, stored I and P frames. The hierarchical nature of the coded frames comprising MPEG groups of pictures necessitates that each group of pictures or GOP is decoded in a forward direction through the picture sequence. Thus reverse playback modes may be provided by jumping to transduce an earlier, preceding I picture and then playing forward and decoding through that GOP. The decoded frames are all stored in frame buffer memories which are read out in reverse of the decoding order to achieve reverse program motion. Thus reverse playback may be facilitated but with a cost penalty incurred by the number of frame buffer memories required to store the decompressed video pictures from each group of pictures.

SUMMARY OF THE INVENTION

In an inventive arrangement a storage medium has recorded thereon a packetized digitally encoded image representative signal for forward and reverse direction reproduction. The digitally encoded signal comprises a plurality of groups of pictures, a group of the plurality of groups including at least an intra coded picture and a predicted picture. The intra coded picture type and the predicted picture type each comprise top and bottom fields. The predicted picture type has a first motion vector for decoding in the forward direction, and has a second motion vector for decoding in the reverse direction. In a further inventive arrangement a storage medium has recorded thereon a packetized digitally encoded image representative signal for forward and reverse direction reproduction. The digitally encoded signal comprises a plurality of groups of pictures, a group of said plurality of groups including at least an intra coded picture and a predicted picture. The intra coded picture and the predicted picture comprise a top field and a bottom field. The digitally encoded signal comprises A motion vector for constructing the predicted picture from a predetermined only one of the top and bottom fields.

BRIEF DESCRIPTION OF THE DRAWINGS

FIG. 2 is a simplified block diagram of a digital video disk player illustrating functional partitioning.

FIG. 7 is a chart depicting an inventive arrangement employing four field buffer memories to facilitate reverse trick play reproduction at three times normal speed.

DETAILED DESCRIPTION

Figure 1A:
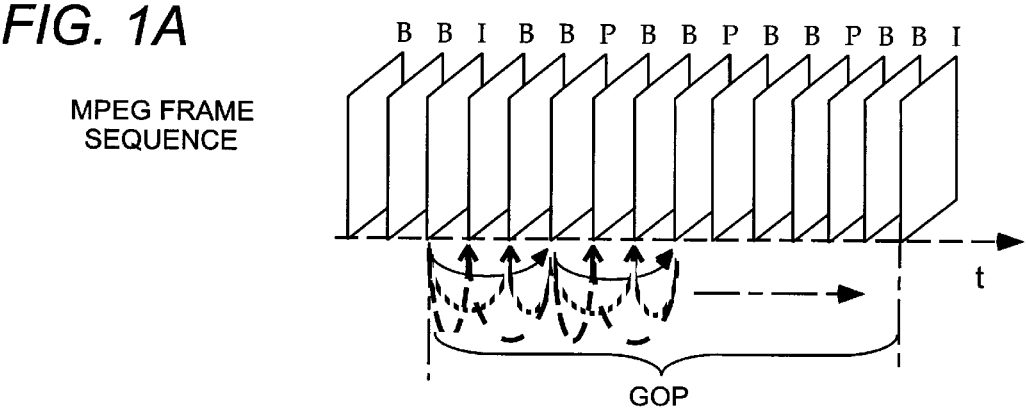
FIG. 1A illustrates an MPEG 2 group of pictures.

An MPEG 2 signal may comprise three types of pictures arranged in groups of pictures or GOPs. The group of pictures may, for example, contain 12 frames arranged as illustrated in FIG. 1A. An intra-coded frame, depicted as I, may be decoded without reference to any other frame and each group of pictures may only be decoded following decoding of the I frame. The first predicted frame or P frame, may be decoded and stored based on modification of the stored, preceding I frame. Subsequent P frames may be constructed based on prediction from the stored preceding P frame. The prediction of P frames is indicated in FIG. 1A by the curved, solid arrow head lines. Finally, bi-directionally coded or B frames may be decoded by means of predictions from preceding and or succeeding frames, for example, stored I and P frames. Decoding of B frames by predictions from adjacent stored frames is depicted in FIG. 1A by the curved, dotted arrow head lines.

The hierarchical nature of the coded frames comprising MPEG groups of pictures necessitates that each group of pictures or GOP is decoded in the forward direction. Thus reverse playback modes may be provided by effectively jumping back to an earlier, preceding I frame and then decoding in a forward direction through that GOP. The decoded frames are stored in frame buffer memories and read out in reverse of the decoding order to achieve the desired reverse program sequence.

Figure 1B:
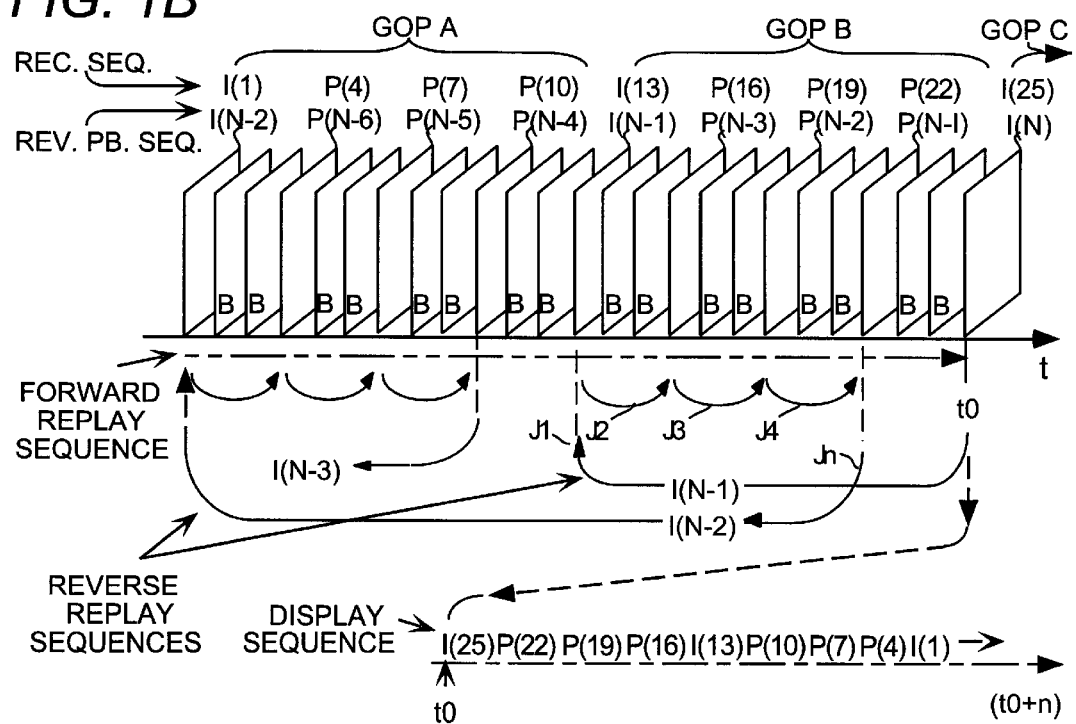
FIG. 1B illustrates recorded groups of pictures, during replay and reverse trick play at three times speed.

In FIG. 1B play back in a forward direction at normal play speed is illustrated by the broken straight arrow head line. At a time prior to time t0, a reverse three times speed, mode trick play mode is selected, and initiated at time t0 where I-frame I(25) is decoded and displayed. As previously described the next frame required for reverse trick play decoding is I-frame I(13), thus the transducer is moved, as indicated by arrow J1 to acquire frame I(13). The signal recovery and decoding then follows the sequence indicated in FIG. 1B by arrows J1, to acquire I(13), J2, to acquire P(16), J3 to P(19), J4 to P(22) . . . Jn.

FIG. 2 illustrates a sequence for decoding, storing and outputting the frames depicted in FIG. 1B. The sequence facilitates reverse replay at three times play speed without constraint on the number of frame buffers used. As described previously, the coded relationship existing within each GOP necessitates that each group of pictures is decoded in a forward direction starting from an I-frame or picture. Thus, reverse mode features may be provided by effectively jumping back to an earlier, or preceding I frame and then decoding in a forward direction through that GOP. The decoded frames are stored in frame buffer memories for subsequent read out in reverse order. In FIG. 2 the sequence is initiated at the START block, with a forward play mode initiated at block 100. Decoding and output signal generation is not charted for the forward play mode at block 100. At block 200 a reverse three times play speed mode is selected and followed, at block 210, by the decoding of an intra coded picture I(N). Decoded picture I(N) is stored in a frame buffer at block 310, which is read out at a rate appropriate for the generation of a standard output signal, for example NTSC or PAL, at block 380. Following the decoding of picture I(N), the next preceding I picture I(N−1) is obtained and decoded at block 220 and stored in a second frame buffer at block 320. Output signal generation proceeds to block 381, essentially independent of the decoding and storing sequences, and repeats picture I(N) stored at block 310. Following picture I(N−1) decoding, the first P picture P(N−3) of GOP B is decoded at block 230 and stored in a third frame buffer at block 330. The output signal generation proceeds to block 382, and repeats picture I(N) stored at block 310. Following decoding at block 230 a second P picture P(N−2) of GOP B is decoded at block 240 and stored at block 340 in a fourth frame buffer. The third P picture P(N−1) is decoded at block 250 and stored in a fifth frame buffer at block 350.

Having completed decoding and storing GOB B, the portrayal of reverse scene motion is initiated at block 383 which outputs P picture P(N−1) from frame buffer block 350. The next output picture P(N−2) is read from frame buffer block 340 and is output at block 384. Concurrently, the next preceding I picture I(N−2) of GOP A is obtained, decoded at block 260 and stored at block 360. Possibly picture I(N−2) may be stored in the first frame buffer (block 310) since frame I(N) has been displayed and is no longer required. Following block 260, P picture P(N−6) is decoded at block 270 and stored in frame buffer block 370 which may be, for example the fifth buffer. At output block 385 the next picture P(N−3), is read from frame buffer block 330 and output. The reverse portrayal of GOP B is completed with picture I(N−1) from block 320 which is output at block 386. The next output picture P(N−4) is derived from GOP A and is output at block 387. Clearly the decoding and storage of GOP A has proceed, (indicated by the broken arrow head lines) independently and concurrently with the cyclically repetitive generation of output pictures.

The reverse play sequence of exemplary FIG. 2 illustrates the use of five frame buffers (blocks 310–350) to achieve reverse replay at three times play speed. However, the provision of such memory capacity to facilitate reverse reproduction may represent an unnecessary manufacturing cost which may be advantageously avoided by various inventive arrangements employing two frame buffer memories.

Figure 3:
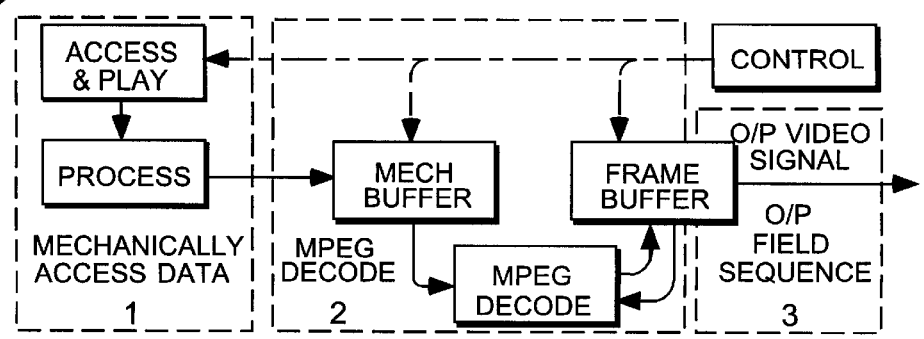
FIG. 3 illustrates a sequence for decoding, storing and outputting pictures in a reverse direction at three times play speed.

A simplified digital video disk player is shown in FIG. 3 with functional partitions to illustrate differing temporal occurrences, and data delivery rates existing within the player. Functional block 1 includes the disk, optical pick up, drive mechanism, disk and optical pick up servo systems and playback signal processing system. Functional block 2 includes an MPEG decoder, mechanical buffer and frame memories. The mechanical or track buffer is a digital memory which provides buffer storage of the transduced data signals processed from the disk mechanism of the player front end. Thus the MPEG decoder is temporally decoupled from an intermittent, and higher data delivery rate from a disk rotated at greater than nominal speed. As described previously, MPEG decoding is facilitated by the frame buffer memory which is written to and read from, as required by the control block. The DVD player may be required to generate, for example, an NTSC or PAL encoded output signal which is facilitated by cyclical reading, (functional block 3), of the frame buffer memory. Thus an exemplary NTSC output picture may be generated by repetitive readout of the frame buffer memory as illustrated in blocks 380–389 of FIG. 2. The simplified partitioning shown in FIG. 3 illustrates the intermittent and temporally separate operations occurring during DVD replay.

Figure 4:
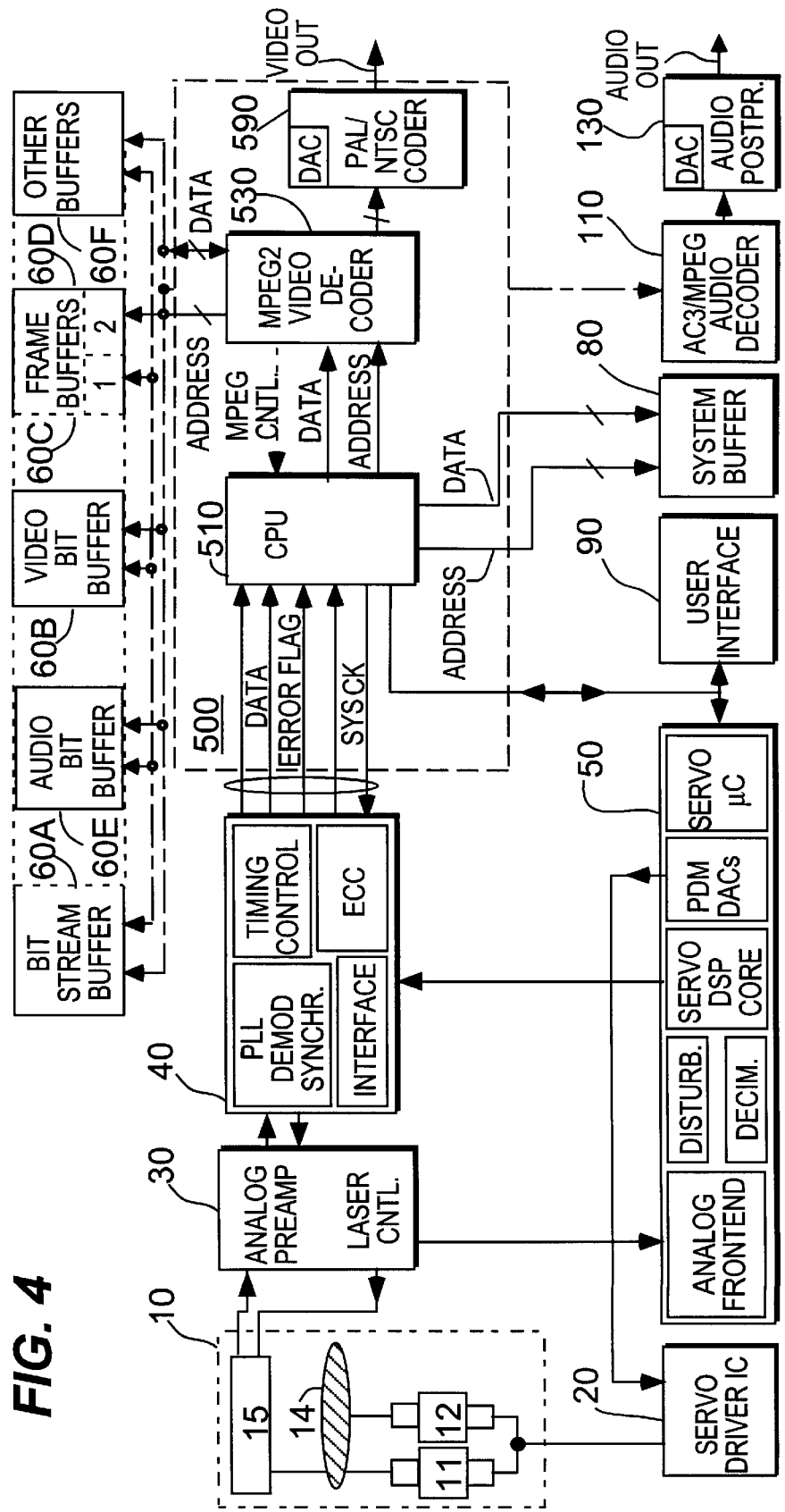
FIG. 4 is a block diagram of an exemplary digital video disk player including inventive arrangements.

FIG. 4 depicts an exemplary block diagram of a digital video disk player. Block 10 depicts a deck which may accept a digitally recorded disk 14 for rotation by a motor 12. A digital signal is recorded on disk 14 as a spiral track containing pits with respective pit lengths determined by an 8/16 modulation coding responsive to respective signal data bits. The record on disk 14 is read by pick up 15 which gathers reflected laser illumination. The reflected laser light is collected by a photo detector or opto pick-up device. An imaging device, for example a lens or mirror, which form part of pick-up 15, is servo controlled and driven by motor 11 to follow the recorded track. Different parts of the recording may be accessed by rapidly repositioning the imaging device. Servo controlled motors 11 and 12 are driven by integrated circuit drive amplifier 20. Pick up 15 is coupled to an opto preamplifier, block 30, which includes drive circuitry for the laser illuminator. A preamplifier provides amplification and equalization of the reflected signal output from the opto pick-up device. The amplified and equalized replay signal from opto preamplifier 30 is coupled to a channel processor block 40 where the replay signal is employed to synchronize a phase locked loop which is utilized to demodulate 8/16 modulation code employed for recording. The demodulated replay data is error corrected by means of Reed Solomon product coding which was included with the data prior to 8/16 modulation and recording. Thus, the error corrected data signal bitstream is coupled to a bit stream, track, or mechanical buffer memory 60A. Buffer memory 60A is used to store sufficient data such that when decoded, data lost during repositioning of imaging device 15 on disk 14 is invisible. Thus buffer memory 60A allows the viewer to perceive the final output image stream as continuous or seamless, without discontinuities. Bitstream buffer memory 60A may, for example, form part of a large memory block having a capacity of, for example, 16 megabytes. Such an exemplary 16 megabyte memory block may, for example be further partitioned to form frame buffers 60C and 60D which provide storage for two decoded image frames. Prior to decoding the compressed video bit stream may be stored in buffer 60B, with an audio bit stream and other data stored in buffers 60E and 60F respectively. The channel processor (40) also provides control of reading and writing to bitstream buffer 60A. Data may be intermittently written to the bitstream buffer, as a consequence of changes in replay track addresses, for example, resulting from trick play operation, user defined replay video content such as a "Directors cut", parental guidance selection, or even user selectable alternative shot angles. To facilitate more rapid access and recovery of the recorded signal, disk 14 may be rotated at an increased speed resulting in the transduced bitstream being intermittent and having a higher bit rate. This higher speed, intermittently delivered bitstream may be effectively smoothed by writing to buffer 60A and reading out for MPEG decoding at a lower more constant rate.

The channel processor block 40 is also coupled to a servo control integrated circuit, depicted as block 50, which provides drive and control signals for servo motors 11 and 12. Motor 12 rotates disk 14 and may provide servo controlled rotation at a plurality of speeds. The positioning of opto pickup block 15 is servo controlled by motor 11, which in addition, may be controlled to rapidly reposition or jump to another track location on the disk surface.

The digital video disk player is controlled by a central processing unit or CPU, element 510 of block 500, which accepts the reproduced bitstream and error flags from channel IC 40, and provides control instructions to servo IC 50. In addition CPU 510 accepts user control commands from user interface 90, and MPEG decoder control functions from the MPEG decoder element 530 of block 500. A system buffer block 80 is addressed by and provides data to CPU 510. For example, buffer 80 may comprise both RAM and PROM memory locations. The RAM may be used to store descrambling or decryption information, bitstream and frame buffer memory management data, and navigation data extracted from the replayed bitstream. The PROM may, for example contain, pickup jump algorithms for trick play at a selection of speeds in forward and reverse directions.

The MPEG encoded bitstream is coupled from CPU 510 for separation or demultiplexing to separate audio, video and control information from the encoded bitstream. The demultiplexing may be performed in hardware or by software controlled by CPU 510. Separated compressed video bits are stored in bit buffer 60B and separated compressed audio bits are stored in buffer 60E. Certain decoded frames from each group of pictures are written to frame buffers 60C and 60D for subsequent use in deriving other frames of each GOP. Frame buffers 60C and 60D have a storage capacity of two video frames and during trick play operation are advantageously addressed to store fields from four pictures, as will be more fully described. Separated audio packets are stored in buffer 60E which is read out and coupled for audio decoding in block 110. Following MPEG or AC3 audio decoding a digitized audio signal results which is coupled to an audio post processor 130 for digital to analog conversion and generation of various base band audio signal outputs. A digital video output is coupled from decoder 100 to encoder 120 which provides digital to analog conversion and generates a baseband video components and encoded video signals.

To avoid the buffer memory requirements depicted in FIG. 3, an inventive method of frame buffer allocation is employed and is described with reference to FIGS. 4 and 5. In FIG. 5 frame buffers 60C and 60D may be advantageously controlled to provide frame storage and display capabilities for I and P pictures in a forward play mode, and for reverse trick play modes be reconfigured to provide storage of single fields from four different decoded pictures. Thus, by addressing the frame buffers as field memories, the number of decoded pictures which may be stored is doubled. Frame buffers 60C and 60D are depicted in FIG. 5 as play mode frame buffers 1 and 2, and are illustrated with partial arrays of exemplary raster lines. During reverse trick play operation the exemplary raster lines may be alternately addressed to provide storage of single fields from four decoded pictures. An exemplary first or top field is depicted with diagonal shading, with an exemplary second or bottom field shown unshaded. The reconfiguration of frame buffers 60B and 60C to provide storage of four fields assumes an ability to write an individual field of memory without effecting the other field stored within the same frame buffer. Alternatively frame buffers 1 and 2, may be facilitated by blocks of random access memory with addressing controlled to provide storage of either 2 frames or individual fields from four different decoded pictures. The advantageous control to provide of storage of fields rather than frames during trick play operation may result in decreased vertical spatial resolution for certain decoded pictures.

Figure 5A:
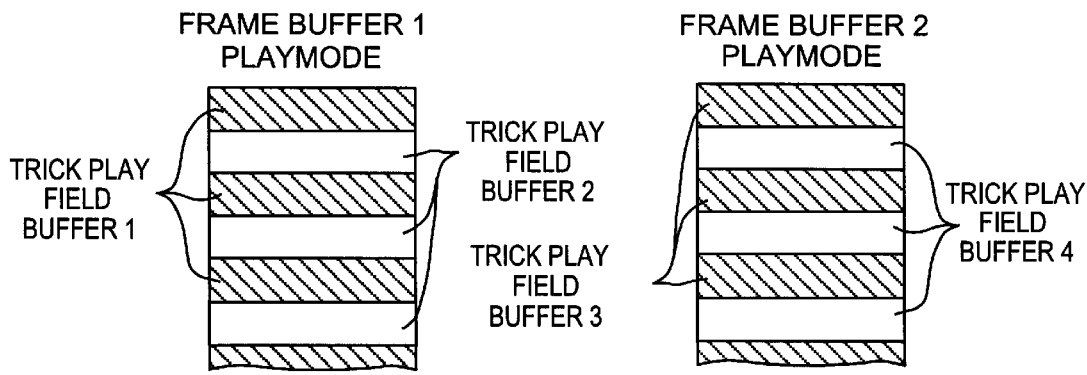
FIGS. 5A–D illustrate an inventive allocation of two frame buffer memories to facilitate play and reverse trick play operating modes.
Figure 5B:
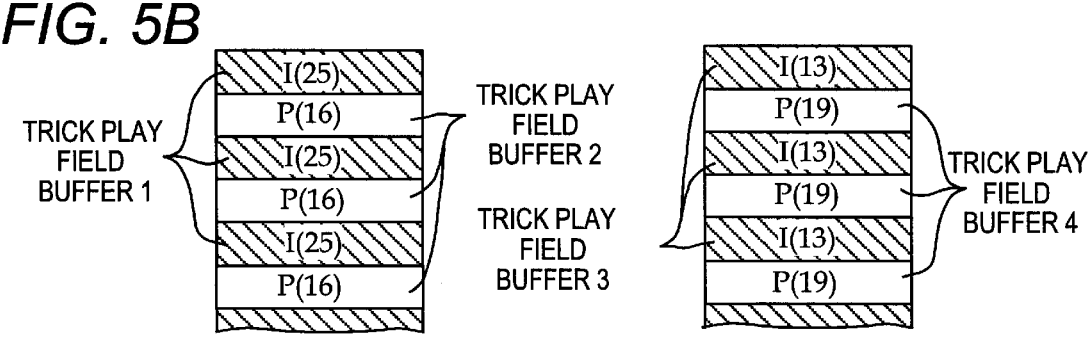

The storage of decoded fields rather than frames may, for certain encoding predictions, require that the motion vectors, which point to the prediction source, be modified or changed to avoid spurious picture generation. Such spurious or erroneous picture generation may result if a motion vector points to a preceding prediction source, for example a field, which was not selected for storage in one of the four field buffers. The erroneous picture results because the information stored at the motion vector address is from a field which may be widely temporally separated from the information selected as a predictor during encoding. For example, FIG. 5B depicts field memories 1, 2, 3, and 4 with their respective contents during the period of output fields 4 to 10, and erroneous picture formation may be considered with reference to FIG. 7. During output field period 4, picture P(19) is to be decoded with the prediction derived from a single field of picture P(16), stored in field buffer 2. However, the motion vectors generated during MPEG encoding to describe the formation of picture P(19) from picture P(16) may point to the non-stored and discarded field of P(16). Since the single field of picture P(16) is stored adjacent to a single field of picture I(25) the motion vector requires modification to avoid erroneously pointing to a field from a widely temporally spaced picture.

The need for motion vector modification may be determined within the MPEG decoder where a motion vector flag, motion_vertical_field_select is tested for matching or parity with the predetermined stored field type, for example top or bottom field. If the field pointed to by the vector and the stored prediction field are mismatched the motion vector is modified. In a first modification method (1), an exemplary system is assumed where only bottom fields are selected for storage and the current macro-block uses frame prediction. A motion vector is represented by two components x and y, where x represents a horizontal value and y represents a vertical value. Each motion vector has a maximum value of 12 bits. To prevent a mis-match the vertical component y of the MV is changed by setting bit 0, or LSB and bit 1 to zero. Setting bit 0 to zero results in the deletion of a ½ pixel vertical interpolation offset. Setting bit 1 to zero ensures that the bottom field of the macro_block being decoded is predicted from the stored, exemplary bottom, prediction field, regardless of the encoded determination.

In the exemplary system storing bottom fields only, if the current macro-block employs field prediction and the motion_vertical_field_select flag=0, then prediction is to be derived from the top field. Hence to derive prediction from the bottom field requires that the flag is reset such that motion_vertical_field_select=1, then the motion vector may be used as is.

A second method (2) may be used in the exemplary system, when the stored predictor field and the field pointed to by the motion vector are mismatched. In this second method the read address of the predictor memory is modified to repeat each line of predictions as it is read from memory.

Figure 5C:
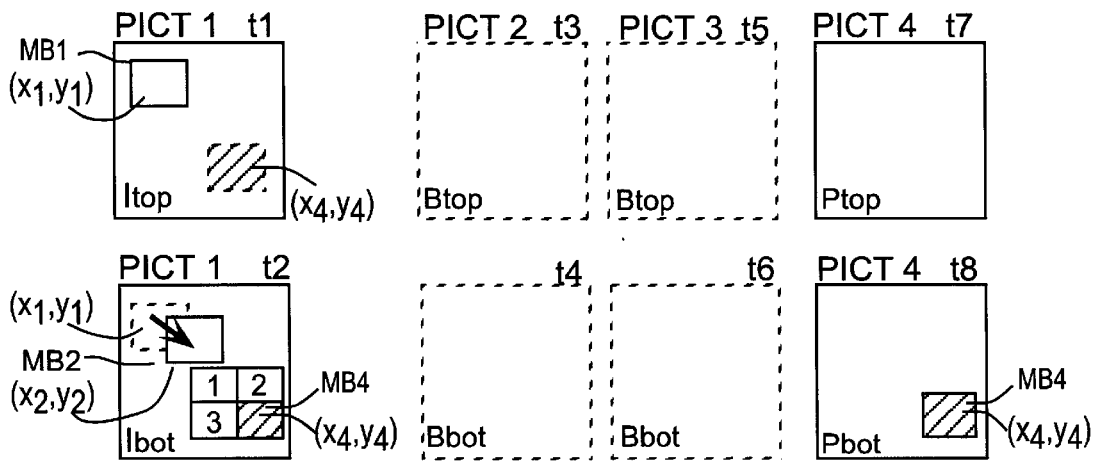

Motion vectors may be modified in a third method (3), which employs arithmetic scaling of the motion vector horizontal and vertical components x and y. FIG. 5C illustrates a series of pictures where a macro-block MB4 is to be decoded using motion vectors (x4,y4), in the bottom field of picture 4, and must be decoded with prediction from the stored bottom field of picture 1. If macro-block MB4 is field predicted and the motion_vertical_field_select flag=0, indicating prediction from the top field and, since only the bottom field of picture 1 is stored, the motion vector must be modified. The modified motion vector may be calculated for prediction from the bottom field by scaling in proportion to the temporal differences between the respective fields. This scaling method assumes that image motion between fields was linear. The scaling calculation is as follows where (x,y) represent the transmitted motion vector and (x',y') the modified value;

$$x' = \left[\frac{t8 - t2}{t8 - t1}\right] \cdot x$$

$$y' = \left[\frac{t8 - t2}{t8 - t1}\right] \cdot y$$

For example, in FIG. 5C there are two B-frames between the current field and the prediction field thus, $$\left[\frac{t8 - t2}{t8 - t1}\right] = \frac{6}{7} \text{ hence, } (x', y') = \frac{6}{7}(x, y).$$

Having scaled the transmitted motion vector to produce MVs (x',y') the motion_vertical_field_select flag is set to 1. If the exemplary macro-block MB4, had been frame predicted then method (1) is simpler to implement, and since there is no temporal difference between predictions from top or bottom fields, the resulting image may be substantially free of visible image impairments.

Figure 5D:
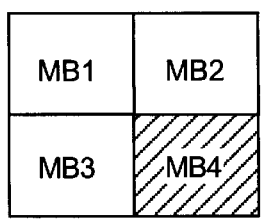

In a fourth method (4), motion vectors (x4,y4) for the exemplary macro-block MB4 may be modified, subject to certain constraints, by substitution of MVs from a preceding macro-block of the field currently decoding. FIG. 5D illustrates the macro-blocks which adjoin exemplary macro-block MB4. If field prediction is used for exemplary macro-block MB4 and the motion vector for constructing MB4 points to the previous top field, then the motion vector from macro-block MB2 may be used if MB2 was coded using motion compensation. However, if macro-block MB2 was frame_predicted then its vertical motion vector component must be divided by 2. In addition, if macro-block MB2 was field_predicted its motion vector may only be used if the bottom field of macro-block MB2 was predicted from a bottom field of the previous frame. Macro-block MB3 may also provide a substitute motion vector for macro-block MB4 providing it was coded using motion compensation. Hence, if MV substitution is permissible, the motion_vertical_field_select flag is set to 1. These substitution methods of motion vector modification within the current picture are computationally simple to implement and simulation indicates usefulness in reducing the visibility of block distortion in scene areas with low spatial frequency content.

The need to modify a motion vector may be readily determined as described previously by comparison between the stored predictor field and the field pointed to by the motion vector. However, determination of, or selection between the modification methods to be employed may be facilitated adaptively during replay on a macro_block basis. Such adaptive determination of MV modification method may be provided by monitoring the status of headers within the MPEG bit stream. For example, an indication of the material origin may be obtained from frame_rate_value present in the sequence header. For example, a frame rate of 24 fps indicates that the material is of film origin. Thus with film origination and frame based prediction, the first method (1) may be employed to produce images largely free of visual impairments. Such largely error free performance results because, although the modified motion vector now points to the wrong field, top or bottom, the actual object or image element to be constructed may be spatially mislocated by a raster line pitch or less. For example, in picture 1 of FIG. 5C during time period t1, if macro_block MB1 is derived from film, its position during time period t2 has changed by a raster line pitch or less because both top and bottom fields were derived from a common image, resulting from a single temporal event. Hence image displacement due to inter field motion cannot exist.

A further adaptive control indicator for MV modification may utilize a sequence_extension located within the sequence_header of the MPEG video bit stream. The sequence_extension contains a progressive_sequence flag which, if set to 1 indicates that the original source material was progressively scanned. Thus this encoded indication of a progressively scanned image source may be employed to select method 1, or 2 for motion vector modification. However, detection of an interlaced image source, ie. progressive-sequence flag set to 0, may direct the modification choice to method 3 or method 4. For example, in picture 1 of FIG. 5C during time period t1, if the macro_block located by MB1 is derived from a television camera, its position at time period t2 may have changed considerably more than a raster line pitch, as depicted by the arrow showing its movement to a new position located by MB2. In a TV camera, and especially one with CCD imagers, top and bottom fields are likely to be exposed separately, possibly having exposure periods of less than one field, thus guaranteeing that any motion within the scene will be visibly different between top and bottom fields.

Methods 1 and 2 are simple to implement and probably most useful in scene areas of low spatial frequency content, for example, the sky. Although method 4 appears the simplest form of modification, freedom from visible impairments may be achieved only when adjacent macro_blocks contain similar image content. In addition method 4 may only be employed following evaluation of the adjacent macro_block type. Although method 3 is more computationally complex than the other methods, simulated results indicate that fewer prediction errors are visible when compared with method 4 on scenes with moderate to high spatial frequency content.

A further method for adaptive control may be based on content similarly within adjoining or adjacent macro_blocks. Adaptive selection of motion vector modification may be derived from classification of the spatial frequency content represented by the discrete cosine transform coefficients within each macro_block of intra coded pictures For example, adjoining macro_blocks MB2 and MB3 of FIG. 5D may be analyzed for spatial frequency content by grouping coefficients representing energy occurring horizontally, vertically and diagonally within each macro_block. An average high frequency content is calculated for each direction, together with a ratio of minimum to maximum values for each direction. The average high frequency content values may be used to separate macro_blocks into groups representing high and low content of spatial frequencies. The high content group may be further classified to form either texture or edge macro_blocks. For example, a texture, or second type macro_block, may be representative of an image of a grill or repetitive pattern which yields a rich source of high frequency content. An edge or third type macro_block, although having significant content of high spatial frequency components, the content may be representative of an image containing an edge transition and thus may not be present in more than one block direction. Classification may be performed by comparison of the calculated average parameter values against threshold values, for example, a macro_block may be classified as smooth or first type, if the average high frequency content for each direction is less than predetermined threshold values. A texture, or second type macro_block, may be identified if the average high frequency content for each direction is greater than the predetermined threshold values, the minimum content value for each direction is greater than a second predetermined value, and the ratio of minimum to maximum content values for each direction exceed a third threshold value. Macro_blocks which fail classification as either smooth or texture may be identified as edge or third type macro_blocks.

Figure 6:
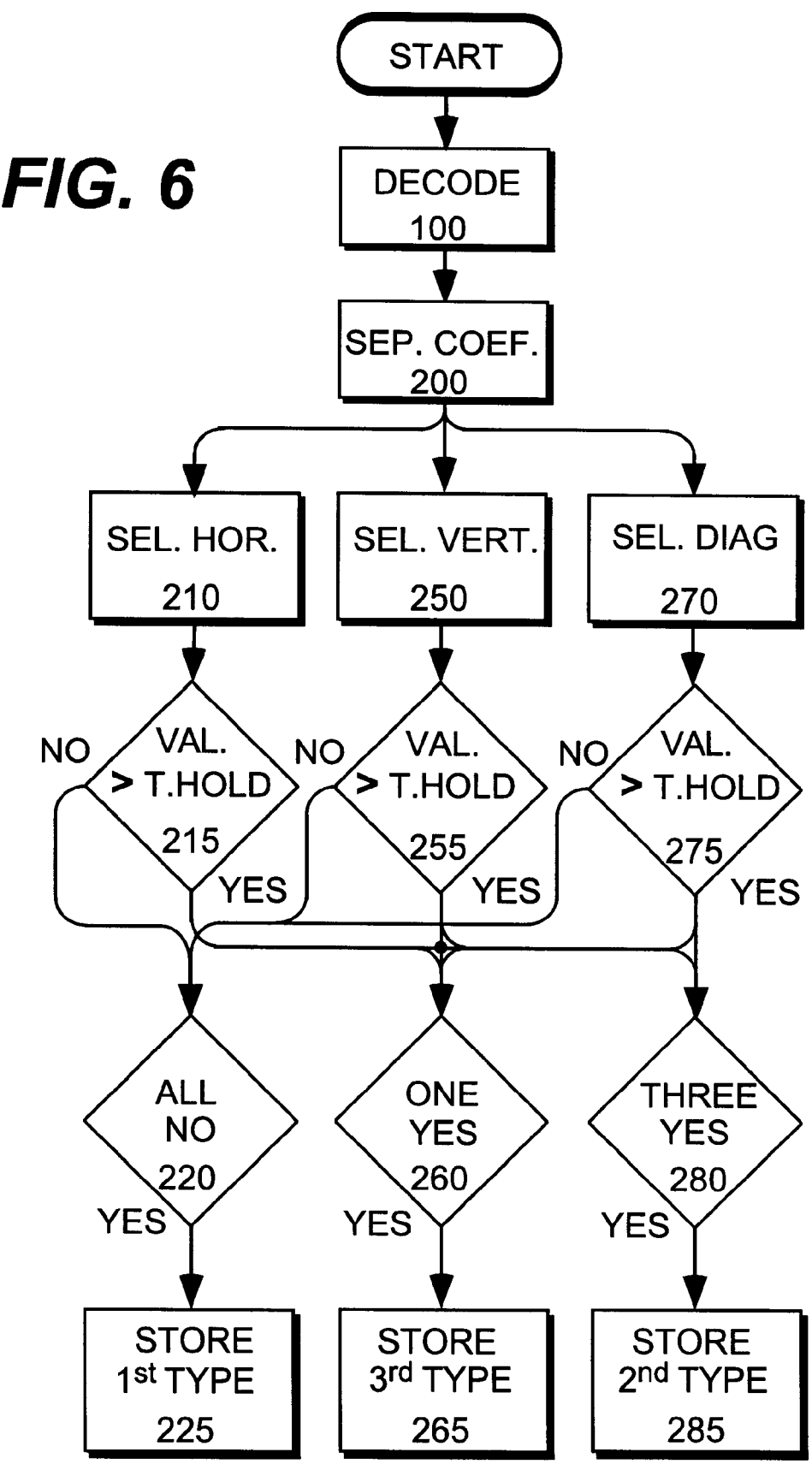
FIG. 6 illustrates functional steps for determining block type.

FIG. 6 is an exemplary flow chart depicting one method for characterizing the spatial frequency content of each macro_block. In FIG. 6, a method is shown where DCT coefficient values are analyzed, as described previously, by means of a parallel processing operation. However, such processing may well be performed in a sequential manner with the results of each directional analysis stored temporarily prior to block type classification. As described previously, the results of threshold processing at steps 215, 255 and 275 are combined at steps 220, 260 and 280 respectively to generate the macro_block classification types which are then stored for subsequent use to adaptively determine selection of motion vector modification method. For example, if either macro_blocks, for example MB2, MB3 of FIG. 5D, of the predictor field adjacent to the target, or currently, decoding macro_block are classified as smooth then MV modification methods 1 or 4 may be employed. If the adjacent macro_blocks are classified as edge blocks then methods 1, 2 or 3 may be selected. Texture classified adjacent blocks may cause the selection of either methods 1 or 2.

During MPEG encoding motion vectors may be derived from the temporally nearest anchor I or P picture. If macro_block MB4 in P-picture 4 of FIG. 5C is considered, prediction will be derived from I-picture 1. If I-picture 1 originated on film there will be little difference between predictions from the image or fields occurring at time t1 and time t2. However, if the original picture source was an interlaced scanning CCD camera, considerable differences may exist between fields at times t1 and t2. Thus, with reference to macro-block MB4, an encoder prediction is statistically more likely to be derived from picture 1 time t2 since this bottom field picture is, for example, approximately 1/60 second closer temporally to picture 4, occurring at time t8. In addition, since motion may occur and be captured between times t1 and t2 of picture 1, the picture occurring during at time t2 has a higher probability of matching or providing a better basis for derivation for macro-block MB4. Thus, if decoder memory size is constrained to store only single field predictors then, in view of the forgoing observation, selection of bottom fields for storage offers a greater probability that encoded motion vectors will be derived from a preceding bottom field. For example, macro-block MB4 has a greater probability of prediction from picture I time t2 than time t1. Thus the selection of only bottom fields for storage may greatly reduce or largely obviate the need to modify motion vector values when storing single fields as predictors.

In a further method, spurious picture decoding in trick modes may be avoided by advantageously encoding disks to facilitate trick mode reproduction. For example, during MPEG encoding motion vector generation may be constrained to only one field, namely the single field which is stored during trick play operation. Obviously such an encoding constraint on motion vector generation requires a similar constraint in the decoder which must store the same field. The constraint of motion vector generation to a single field in film derived material may not result in reduced compression efficiency, for example, as represented by a reduction in program minutes on a disk. However, with TV originated material, where significant motion may exist between interlaced fields, such a single field constraint on motion vector generation may result in some loss of program length per disk as a result of less efficient compression. A loss of program length or compression efficiency may be advantageously avoided by separately encoding sets of motion vectors specifically for use during trick play operation. This extra, or redundantly encoded data requires disk space, however, since these trick play motion vectors enable decoding at temporal rates greater than normal play speed they represent a proportionately smaller amount of data. For example, at three times play speed the number of trick play motion vectors is at least one third that of play speed operation. In addition, as described earlier, such trick play motion vectors would be generated only when the encoder selects prediction from a non-stored field, thus further reducing the amount data to be redundantly recorded. In addition, three times speed trick play motion vectors may be advantageously employed at other trick play speeds, for example at six times speed.

Decoders for MPEG signal streams have been proposed which have sufficient processing speed to decode an entire frame during the period of one field. In addition such decoders may employ only two frame buffers to facilitate decoding in the forward direction, for example, at normal play speed. In such decoders two reference pictures or frames, for example I or P, may be stored from which B-frames may be decoded. Thus, to enable B-frame decoding with only two frame memories requires that the decoder construct the B-frame within a TV field period. Such decoding of B-frames without storage is also known as "decoding on the fly" and this decoding capability assumed in the following example. Furthermore, if computational complexity is considered during MPEG decoding, of the three types of MPEG frames, B-frame decoding represents the greatest processing task. Hence, since it is assumed that B-frames may be decoded within a field interval and without storage, it will be further assumed that I and P frames may also be decoded within a field period.

FIG. 7 is a chart which illustrates a trick play mode operating in the reverse direction at three times play speed. The chart illustrates an advantageous utilization of an MPEG decoder and two frame buffer memories organized to store individual fields from four decoded MPEG frames. The exemplary chart has columns which represent MPEG coded I-frames or pictures and P frames or pictures. The I and P pictures comprise groups of pictures or GOPs A, B and C. In this example only I frames and P frames are decoded, hence only these are illustrated. FIG. 7 depicts a sequence of 25 encoded pictures, with the picture number indicated in parentheses. The decoder requirements will be explained in more detail later. The chart shown in FIG. 7 illustrates trick play reproduction at 3 times play speed in reverse for a video sequence with a 12 frame GOP structure for example, IBBPBBPBBPBB. It is assumed that the video was recorded at a film frame rate of 24 frames/second. Thus, since exemplary FIG. 7 illustrates operation at 3 times play speed, 10 output fields must be generated and displayed for each GOP in order to produce an NTSC standard TV frame rate of nominally 30 frames per second. Chart columns represent I and P pictures in two consecutive GOPs and are listed in forward display order from left to right. The far right column indicates the output field number. The vertical axis of the chart represents time in units of field periods.

The symbols used in FIG. 7 are as follows:

The notation of an uppercase D in a box signifies that the picture at the head of the column containing the box is decoded during the period of the field represented by the row containing that box.

The notation D>i, where i may be 1, 2, 3, or 4, signifies that one field of the picture being decoded is written into field buffer i and the other decoded field is discarded, (field buffers 1, 2, 3, and 4 are shown in FIG. 5).

The notation D>i,j, where i,j may be either 1,2 or 3,4 signifies that both two fields of the picture being decoded are written into field buffers i and j.

The notation Pi, where i may be 1, 2, 3, or 4 indicates that the predictions for both fields of the picture being decoded are obtained from field buffer i.

The notation Pi,j, where i,j may be either 1,2 or 3,4, indicates that the predictions are obtained from field buffers i and j.

The notation di within a box indicates that a field from the picture represented by the column containing that box, was stored in field buffer i and is displayed during the field period represented by the row containing that box.

With reference to FIG. 7, the exemplary reverse decoding process is initiated at picture I(25), time t0 and is designated output field period 1. Picture I(25) is decoded and written into field buffers 1 and 2. Also during field period 1, one field of picture I(25) is displayed. If the decoder is not capable of concurrently decoding, displaying, and writing a field to memory, the display operation may be delayed by 1/60 second or 1 field. The capability of decoding a field, displaying it, and writing it to memory within the same field period is not required at any other time during this exemplary reverse replay mode. During output field period 2, picture I(13) is decoded and written into field buffers 3 and 4, while the second field of picture I(25) is displayed. To obtain picture I(13) the transducer is repositioned to the preceding GOP and data is recovered from the disk. This data representing I(13) is stored in the track or mechanical buffer until required by the MPEG decoder. In the following description it will be assumed that pictures required for decoding have been recovered from the disk and buffered as previously described. During output field period 3, a field from picture I(25) which was stored in field buffer 1 is displayed. Concurrently picture P(16) is decoded, one field of which is written into field buffer 2 and the other field is discarded. The predictors for decoding picture P(16) are obtained from field buffers 3 and 4. During output field period 4, picture P(19) is decoded. One field from picture P(19) is written into field buffer 4 and the other field is discarded. Concurrently with decoding frame P(19), a field from picture I(25), from field buffer 1, is displayed for a final time.

Picture P(19) must be decoded with predictors derived from the single field of picture P(16), stored in field buffer 2. However, the motion vectors generated during MPEG encoding which describe the formation of picture P(19) from picture P(16) may point to the discarded field of P(16). Thus, since each frame buffer may contain fields from widely temporally spaced pictures, the motion vector may require modification, as previously described, to avoid the reconstruction of a largely erroneous picture. FIG. 5B depicts the contents of field buffers 1 to 4 during output fields 4 to 10 (of FIG. 7) and illustrates pictures having a wide temporal spacing. Spurious picture decoding may be avoided during reverse trick play by modifying the motion vectors to provide predictions specific to the stored field of the preceding reference picture, for example frame P(16) of FIG. 7. The various methods described previously may be adaptively selected whenever a discarded field is selected as a predictor.

During output field period 5, picture P(22) is decoded using the single field from P(19), stored in buffer 4 for prediction. As described, the motion vectors may require adaptation. One field of picture P(22) is displayed as it is decoded. In output field period 6, picture P(22) is decoded for a second time by repeating the P(22) bitstream by manipulation of the read address of bitstream buffer 60A. During picture P(22) decoding, one field is coupled for display and neither field is stored. During output field periods 7 through 10, fields from pictures P(19) and P(16), stored in field buffers 4 and 2 respectively, are displayed. At some time after output field period 7 the transducer is repositioned to read picture I(1) which stored in bitstream buffer 60A. However, at field period 11, frame buffer 2 becomes available and I(1) of the next preceding GOP (A) is decoded and written into field buffers 1 and 2. Output field 11 is derived and displayed from picture I(13), stored in field buffer 3. The process described above is then repeated to decode the remainder of GOP (A).

Figures 8A, 8B:
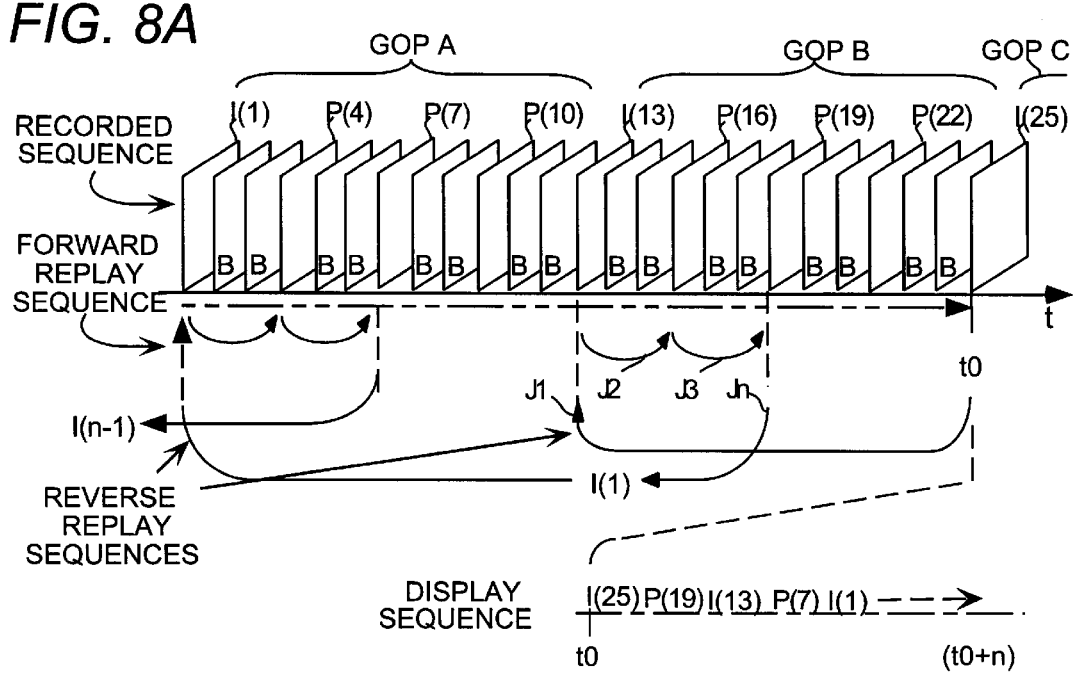
FIG. 8A illustrates recorded groups of pictures during normal replay and reverse trick play at six times speed.
FIG. 8B is a chart showing an inventive method which facilitates reverse trick play reproduction at six times normal speed with an arrangement of four field buffer memories.

Reverse trick play at six times play speed is illustrated in FIG. 8A. A recorded sequence of slightly more than two groups of pictures is shown with I and P frames, or pictures, indicated at the top edge and B frames shown towards the bottom. As previously described the pictures within each GOP must be decoded in sequence starting from the I picture, for example I (1), I (13) or I(25). Hence, to produce reverse image motion requires a control sequence which jumps back and plays forward to recover and store the constituent pictures of each GOP, which are then read out in reverse order. In this exemplary trick play sequence only I and P pictures are decoded. The jump back and play forward sequence for six times reverse play back is depicted starting at time t0 which may be arranged to be an I picture. Arrow J1 is shown pointing from picture I(25) to picture I(13) which represents the next preceding I frame. Picture I(13) is decoded and the result stored. Arrow J2 jumps forward in the GOP sequence from picture I(13) to picture P(16) which is decoded using I(13) as the predictor. The decoded result from picture P(16) is stored to provide a predictor for picture P(19) which is located by arrow J3. Thus, having decoded and stored picture P(19) reverse playback may commence as shown in the display sequence where the stored pictures are read out in reverse of the stored order. It will be noted that, although picture P(16) was stored to provide a predictor, it is not required in the six times play speed display sequence. Having decoded, stored and outputted GOP B, arrow Jn jumps back to the next preceding group of pictures (GOP A) and points to picture I(1). The method described above is repeated yielding the reverse picture display sequence shown in FIG. 8A.

The chart illustrated in FIG. 8B shows a method which utilizes four field stores to facilitate reverse trick play at six times normal speed. The chart columns represent I and P pictures in consecutive 12 frame GOPs (A, B and C of FIG. 8A), listed in forward display order from left to right. The right side column indicates output field number. The vertical axis of the chart represents time in units of field periods. The chart symbols have the same meaning as described for FIG. 7 and the decoder has the same properties as previously discussed.

In FIG. 8B reverse trick play is initiated at picture I(25) of GOP C. Picture I(25) is decoded and stored in field memories 1 and 2 and concurrently one field is displayed as output field 1. At output field 2 the other stored field from decoded picture I(25) is displayed. During the period of output field 2, the transducer is repositioned from the track containing picture I(25) to the track containing picture I(13) of the preceding GOP (B), which is transduced and stored in exemplary track buffer 60A. The use of track buffer permits a temporal disconnection between replay signal transduction and picture data read out for decoding. Hence obtaining a picture may represent either track or buffer readout. Picture I(13) is decoded and stored in field memories 3 and 4. However, output field 3, which represents the last use of picture I(25), is read from field memory 1. Concurrently with the display of output field 3, picture P(16) is obtained and decoded using both fields of picture I(13) as a predictors. A only one field from decoded picture P(16) is stored in field memory 2 the other is discarded. At output field 4 the advantageous decoding property is employed where concurrently, picture P(19) is obtained and decoded by prediction from the single stored field of picture P(16), and a single field from picture P(19) is output as field 4. Output field 5 is obtained by reading memory 2, which contains the single field of picture P(16). During output field 5, picture P(1) of GOP A is obtained, decoded and stored in field memories 1 and 2.

At output field 6 one field of picture I(13) is read from memory 3, and output as field 6. During output field 6, picture P(4) is obtained, decoded and stored in memory 4, using predictions from both fields of picture I(1). Output field 7 is derived by reading the other field of picture P(13) from memory 4. During output field 7, picture P(7) is obtained, decoded and stored in memory 2 with prediction from the stored field of picture P(4). At output field 8, the advantageous decoding property is repeated where concurrently picture P(10) is obtained, decoded with prediction from picture P(7), and output to form output field 8. Output field 9 is read from field memory 2 which contains the single field of picture P(7), and output field 10 is obtained from memory 4 which contains picture P(4). Output fields 11 and 12 are read from field memories 1 and 2 respectively which contain decoded picture P(1).

What is claimed is:

1. A method for recording on a storage medium a packetized digitally encoded image representative signal for reproduction in normal and trick modes, said method comprising the following steps:

encoding a video signal as a plurality of groups of pictures, wherein a group of said plurality of groups including at least an intra coded picture and a predicted picture;

said intra coded picture and said predicted picture having first and second fields;

deriving a motion vector from only one of said fields of said intra coded picture for constructing said predicted picture during said trick mode; and, recording said plurality of groups of pictures and said motion vector on said storage medium.

2. The method of claim 1, wherein said deriving step includes a step of;

selecting a preceding intra coded picture for deriving said motion vector for constructing said predicted picture during said normal mode.

3. The method of claim 1, wherein said recording step includes;

recording said motion vector derived from only one of said fields as part of picture user data contained in said packetized digitally encoded image representative signal.

4. The method of claim 1, wherein said deriving step includes a step of;

selecting a bottom field as said only one of said fields of said intra coded picture.

5. The method of claim 1, wherein said encoding step includes the step of;

originating said video signal from film.

6. An apparatus for reproducing a digitally encoded signal from a medium, comprising:

a source of said digitally encoded signal representative of a plurality of groups of pictures, a group of said plurality of groups including at least one intra coded picture type and at least one predictively coded picture type and motion compensation data;

said motion compensation data being representative of a single field of one of the two picture types; and, a decoder coupled to said source for decoding the two types of pictures, wherein reverse direction reproduction of said at least one predictively coded picture type is decoded responsive to motion compensation data representative of said single field of said one of said two picture types from a preceding group of pictures of said plurality of groups of pictures.

7. The reproducing apparatus of claim 6, wherein said single field is a bottom field.

8. An apparatus for processing a digitally encoded signal, comprising:

a source of said digitally encoded signal representative of a plurality of groups of pictures, a group of said plurality of groups arranged in a sequence including at least one I type and at least one P type picture and motion compensation data;

said motion compensation data indicating a prediction image part for decoding said one P type picture; and, a decoder coupled to said source for decoding said I type and P type pictures, wherein a forward play first mode said P type picture decoding is responsive to said prediction image part being represented by a picture, and in a trick play second mode said one P type picture decoding is responsive to said prediction image part being represented by a single field of said picture.

9. The processing apparatus of claim 8, wherein said single field is a bottom field.

10. The processing apparatus of claim 8 wherein said second mode said motion compensation data is part of picture user data contained in said packetized digitally encoded image representative signal.

* * * * *